Feb. 17, 1925.

J. W. UNDERWOOD 1,527,096

MOTOR CYCLE SIDE CAR

Filed Nov. 14, 1922

Inventor
J. W. Underwood by

Attorney

Patented Feb. 17, 1925.

1,527,096

UNITED STATES PATENT OFFICE.

JOHN W. UNDERWOOD, OF MELBOURNE, VICTORIA, AUSTRALIA.

MOTOR-CYCLE SIDE CAR.

Application filed November 14, 1922. Serial No. 600,938.

*To all whom it may concern:*

Be it known that I, JOHN WALTER UNDERWOOD, a subject of the King of Great Britain and Ireland, and a resident of Melbourne, in the State of Victoria, Commonwealth of Australia, have invented certain new and useful Improvements in Motor-Cycle Side Cars, of which the following is a specification.

This invention relates to motor cycle side car underframes of the kind including inner and outer crank arms, the outer arm carrying the side car wheel whilst the inner arm is connected to the cycle frame. My prior United States Patent No. 1,434,269, dated Oct. 31, 1922, sets forth a construction of the above type wherein the arms are controlled by a resilient element extending laterally between them. The arms of the crank axle are united by a lateral part carried by the side car body and the lateral resilient element is adjustably carried by the body.

With the construction referred to it has been usual for the manufacturer of the side car chassis to supply the side car body as, owing to the skill required, it has not generally been advisable to dispose of a chassis and fittings and permit independent attachment of a body. A complete chassis of the foregoing type was not therefore sold as a unit without a body because a purchaser could not himself conveniently fit a separate body.

An important feature of the present invention resides in the fact that a chassis embodying the principle of construction before set forth may now be sold by the manufacturer without the body being applied, and a purchaser may readily attach a body supplied by himself if he so desires. Another feature resides in the removal of bearings and the like from the body itself thereby eliminating strain and providing a stronger and more durable construction.

Briefly the invention consists in a cruciform undercarriage comprising a longitudinal member carrying both the side car body and the lateral resilient element, and having a bearing to accommodate the lateral part of the crank axle.

The attachment of the chassis to the motor cycle is preferably effected by fittings manufactured in accordance with my prior United States Patent No. 1,224,047, dated April 24, 1917. But in order that this invention may be better understood reference will now be made to the accompanying sheet of drawings which is to be taken as part of this specification and read herewith.

Figure 3:
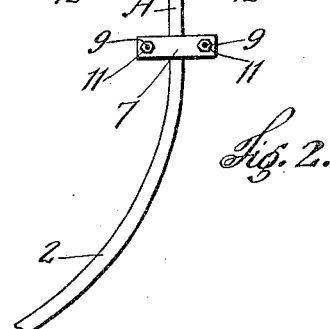
Fig. 3 is a sectional view illustrating the front connection between the motor cycle and side car.
Figure 3:
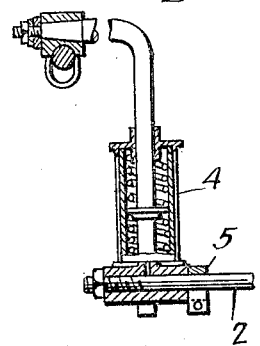

The invention consists in a longitudinal member A having its front end 2 laterally projected towards the motor cycle which is indicated at 3, and coupled thereto by a front connexion 4 preferably of the character disclosed by my prior United States Patent No. 1,434,269, as shown more particularly in Fig. 3.

By means of any suitable split ring, 5, or similar means, and bolt 6 provision is made for laterally adjusting the member A in relation to the connexion 4 in order to provide for correct alignment of the side car with the motor cycle.

Carried by the longitudinal member A is a front plate 7 and a rear platform 8 both of which have upstanding threaded studs 9. The body, indicated at 10, of the side car rests upon the plates 7 and 8 and is secured thereto by nuts 11 threaded upon the studs 9.

Carried by the longitudinal member A is a lateral bearing 12.

Adjustably secured to the member A at or near the rear end thereof, by a clamp 13 or the like, is a shock absorbing resilient element 14 preferably comprising a lateral laminated spring of the character disclosed by my prior United States Patent No. 1,434,269.

Mounted in and passing through the bearing 12 is the axle part 15 of a crank element preferably of the character disclosed by my prior United States Patent No. 1,434,269.

The axle 15 is slidably adjustable in the bearing 12, in order to provide for correct alignment of the side car with the motor cycle. The desired adjusted relation is maintained by holding members in the form of split rings 12$^a$, which when clamped about the axle 15, are rigidly held in relation thereto by securing nuts, as is usual with split ring construction. By arranging these split rings on opposite sides of, and immediately adjacent the bearing 12, and fixing the split rings with relation to the axle 15, it will be apparent that said axle will be held against longitudinal play in the bearing 12, that is, held in adjusted position in said bearing.

Figure 1:
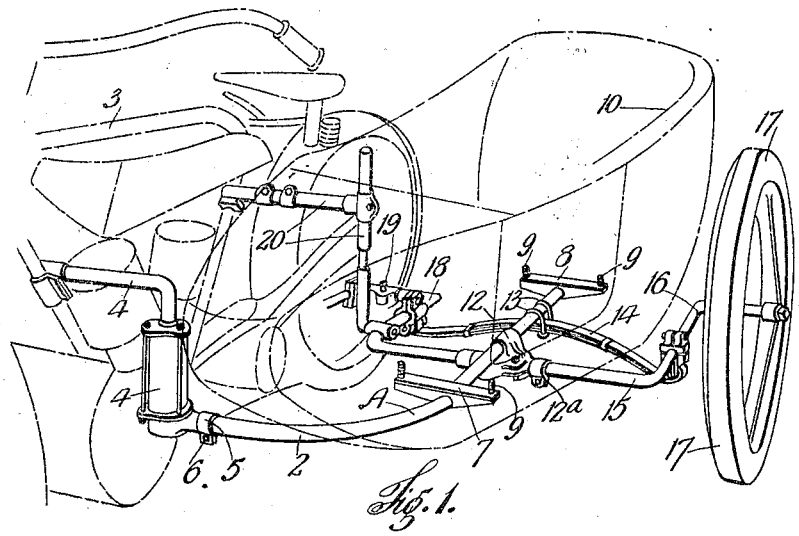
Figure 1 is a perspective view of a chassis according to the invention.
Figure 2:
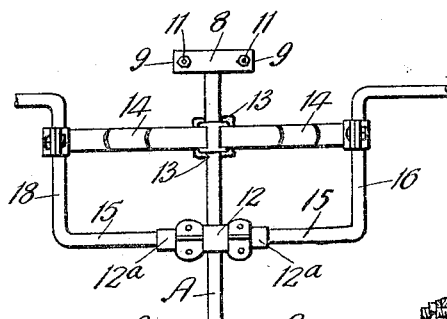
Figure 2 is a plan view of a chassis according to the invention.
Figure 4:
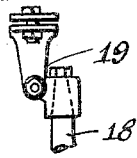
Fig. 4 is a plan of the rear connection between the motor cycle and side car.

The outer arm 16 of the crank element carriers the side car wheel 17 and has secured thereto in any appropriate manner one end of the spring 14. The inner crank arm 18 of the crank element is connected to a rear connexion 19 preferably of the character disclosed by my prior United States Patent No. 1,434,269, as shown more particularly in Fig. 4 and has secured thereto in any appropriate manner the opposite end of the spring 14.

Disposed between the motor cycle and the inner arm or lever 18 is an intermediate connexion 20 comprising vertically disposed telescoping members preferably of the character disclosed by my prior United States Patent No. 1,434,269.

With the present invention it will be seen that the body 10 of the side car is definitely supported by the member A which also carries the shock absorbing elements.

The connexions to the motor cycle function in the manner already known and as shewn by the prior art referred to herein.

Having now particularly described and ascertained the nature of my said invention, and in what manner the same is to be performed I declare that what I claim is:—

1. Improvements in motor cycle side cars, consisting in an underframe comprising a longitudinal member, inner and outer arms pivotally connected to the member, and a shock absorbing means connected to the longitudinal member and the arms.

2. In combination with a side car body, an under frame comprising a single longitudinal member located centrally beneath and directly supporting the body at both ends thereof, and shock absorbing means located beneath the body laterally of and carried by the longitudinal member to provide therewith a cruciform construction.

3. In a side car underframe of cruciform construction having a longitudinal member, a bearing carried by the longitudinal member, a crank element mounted in the bearing, and a spring controlled arm forming part of the crank element and carrying the side car wheel.

4. A side car chassis comprising a longitudinal member to carry the side car body, a front connexion disposed at the forward end of the member, a bearing carried by the member, a crank element mounted in the bearing and having inner and outer arms, a resilient element carried by the member and connected to the arms, an intermediate connexion disposed between the inner arm and the motor cycle, and a rear connexion retaining the inner arm to the motor cycle.

5. Improvements in motor cycle side cars, consisting of a cruciform chassis having a longitudinal member, a connexion securing the front end of the member to the motor cycle, plates carried by the member to support the side car body, a bearing carried by the member, a crank element mounted in the bearing and having inner and outer arms, a resilient element carried by the member and adjustably connected to the arms, an intermediate connexion disposed between the inner arm and the motor cycle, and a rear connexion retaining the inner arm to the motor cycle.

6. In combination with a side car body, an under frame comprising a single longitudinal member centrally located in relation to the body and having a pivotal forward connection, means for directly connecting the body to the member, and a laterally disposed shock absorbing means carried by the member and arranged therewith to provide a cruciform construction beneath the body.

7. In combination with a side car body, an under frame comprising a single longitudinal member centrally located in relation to the body and having a pivotal and resilient forward connection, means for directly connecting the body to the member, and a laterally disposed shock absorbing means carried by the member and arranged therewith to provide a cruciform construction beneath the body.

Dated this 14th day of September, A. D. 1922.

In testimony whereof, I have signed my name to this specification in the presence of two subscribing witnesses.

J. W. UNDERWOOD.

Witnesses:
 Roy Parker,
 Hy Smith.